(12) United States Patent
Kim et al.

(10) Patent No.: US 9,179,450 B2
(45) Date of Patent: Nov. 3, 2015

(54) METHOD AND APPARATUS FOR MANAGING SOUNDING REFERENCE SIGNAL RESOURCE IN WIRELESS COMMUNICATION SYSTEM

(71) Applicant: Samsung Electronics Co. Ltd., Suwon-si, Gyeonggi-do (KR)

(72) Inventors: Bong-Chan Kim, Suwon-si (KR); Ki-Young Han, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 157 days.

(21) Appl. No.: 13/742,659

(22) Filed: Jan. 16, 2013

(65) Prior Publication Data

US 2013/0189976 A1    Jul. 25, 2013

(30) Foreign Application Priority Data

Jan. 20, 2012 (KR) .................. 10-2012-0006672

(51) Int. Cl.
*H04W 72/04* (2009.01)
*H04L 5/00* (2006.01)

(52) U.S. Cl.
CPC ......... *H04W 72/0406* (2013.01); *H04L 5/0048* (2013.01); *H04L 5/0058* (2013.01)

(58) Field of Classification Search
CPC ... H04L 5/0053; H04L 5/0048; H04L 5/0007; H04L 5/0035; H04L 5/0058; H04L 5/0073; H04W 72/042; H04W 72/0413; H04W 72/085; H04W 28/048; H04W 72/0426; H04W 72/0433; H04W 72/0453; H04W 88/08
See application file for complete search history.

(56) References Cited

U.S. PATENT DOCUMENTS

| | | | |
|---|---|---|---|
| 2011/0294529 A1* | 12/2011 | Luo et al. | 455/509 |
| 2012/0202558 A1* | 8/2012 | Hedberg et al. | 455/550.1 |
| 2013/0230018 A1* | 9/2013 | Yagi et al. | 370/330 |

FOREIGN PATENT DOCUMENTS

KR   10-2011-0011145 A   2/2011

* cited by examiner

*Primary Examiner* — Nam Huynh
(74) *Attorney, Agent, or Firm* — Jefferson IP Law, LLP

(57) ABSTRACT

A method and an apparatus for managing Sounding Reference Signal (SRS) resources in a wireless communication system are provided. A method of a base station for managing SRS resources includes receiving an allocation of SRS resources from a system controller, allocating SRS resources to connected terminals that are connected to the BS, determining a number of residual SRS resources varying according to the number of connected terminals, and transmitting one of an additional SRS resource allocation request and an allocated SRS resource return request to the system controller according to the number of residual SRS resources.

8 Claims, 7 Drawing Sheets

METHOD AND APPARATUS FOR MANAGING SOUNDING REFERENCE SIGNAL RESOURCE IN WIRELESS COMMUNICATION SYSTEM

PRIORITY

This application claims the benefit under 35 U.S.C. §119 of a Korean patent application filed on Jan. 20, 2012, in the Korean Intellectual Property Office and assigned Serial No. 10-2012-0006672, the entire disclosure of which are incorporated herein by reference.

BACKGROUND OF THE INVENTION

1. Field of the Invention

The present invention relates to a wireless communication system. More particularly, the present invention relates to an apparatus and method for managing Sounding Reference Signal (SRS) resources in a wireless communication system.

2. Description of the Related Art

In a wireless communication system, in order to estimate a channel between a terminal and a Base Station (BS), the terminal transmits an SRS to the BS. To this end, each BS receives an allocation of an SRS pool index representing SRS resources to be used in a cell area from a system controller, and allocates SRS resources within an SRS resource range corresponding to the allocated SRS pool index to serving terminals.

However, because the number of terminals connected to the BS is not fixed but rather may vary continuously, the continuous use of initially-allocated SRS resources by the BS as described above is not efficient in terms of SRS resource management. For example, assume that the BS can allocate SRS resources to 10 terminals through the SRS resources corresponding to the initially-allocated SRS pool index. In this case, when one terminal is connected to the BS (or when less than 10 terminals are connected to the BS), SRS resources are wasted, and when 10 or more terminals are connected to the base station, SRS resources are insufficient.

Furthermore, in order for neighbor cells to effectively receive an SRS of a terminal, it is necessary to prevent an SRS conflict from occurring between different terminals because neighbor cells use the same SRS resources or neighbor cells adjacent to a specific cell use the same SRS resources. However, an SRS resource allocation scheme according to the related art does not consider the SRS conflict.

Therefore, a need exists for an apparatus, system and method for managing SRS resources in a wireless communication system.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages below. Accordingly, an aspect of the present invention is to provide a method and apparatus for managing Sounding Reference Signal (SRS) resources in a wireless communication system.

Another object of the present invention is to provide a method and apparatus for allocating additional SRS resources in a wireless communication system according to a change in a number of terminals connected to a Base Station (BS).

Another object of the present invention is to provide a method and apparatus for returning SRS resources in a wireless communication system according to a change in the number of terminals connected to a BS.

Another object of the present invention is to provide a method and apparatus for determining SRS resources to be allocated to a BS in a wireless communication system in consideration of SRS resources that are allocated to neighbor cells of the BS by a controller.

Another object of the present invention is to provide a method and apparatus for updating neighbor cell information for SRS resource allocation of a BS in a wireless communication system based on a Measurement Report (MR) message of a terminal.

According to an aspect of the present invention, a method of a BS for managing SRS resources in a wireless communication system is provided. The method includes receiving an allocation of SRS resources from a system controller, allocating SRS resources to connected terminals that are connected to the BS, determining a number of residual SRS resources varying according to the number of connected terminals, and transmitting one of an additional SRS resource allocation request and an allocated SRS resource return request to the system controller according to the number of residual SRS resources.

According to another aspect of the present invention, a method of a system controller for managing SRS resources in a wireless communication system is provided. The method includes allocating SRS resources to a plurality of BSs, receiving at least one of an additional SRS resource allocation request and an allocated SRS resource return request from at least one BS, and performing at least one of an additional SRS resource allocation and an allocated SRS resource return to the BS according to the request of the BS.

According to another aspect of the present invention, an apparatus of a BS for managing SRS resources in a wireless communication system is provided. The apparatus includes a transmitting/receiving unit for transmitting/receiving signals, and a control unit for receiving an allocation of SRS resources from a system controller, allocating SRS resources to connected terminals that are connected to the BS, for determining a number of residual SRS resources varying according to the number of connected terminals, and for transmitting any one of an additional SRS resource allocation request and an allocated SRS resource return request to the system controller according to the number of residual SRS resources.

According to yet another aspect of the present invention, an apparatus of a system controller for managing SRS resources in a wireless communication system is provided. The apparatus includes a transmitting/receiving unit for transmitting/receiving signals, and a control unit for allocating SRS resources to a plurality of BSs, for receiving at least one of an additional SRS resource allocation request and an allocated SRS resource return request from at least one BS, and for performing at least one of an additional SRS resource allocation and an allocated SRS resource return to the BS according to the request of the BS.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of the certain exemplary embodiments of the present invention will be more apparent from the following description taken in conjunction with the accompanying drawings in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the exemplary embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, a description will be given of a method and apparatus for additionally allocating and returning Sounding Reference Signal (SRS) resources according to a change in the number of terminals connected to a Base Station (BS) in a wireless communication system according to the present invention. The wireless communication system described below corresponds to a cellular wireless communication system including a plurality of cells.

Figure 1:
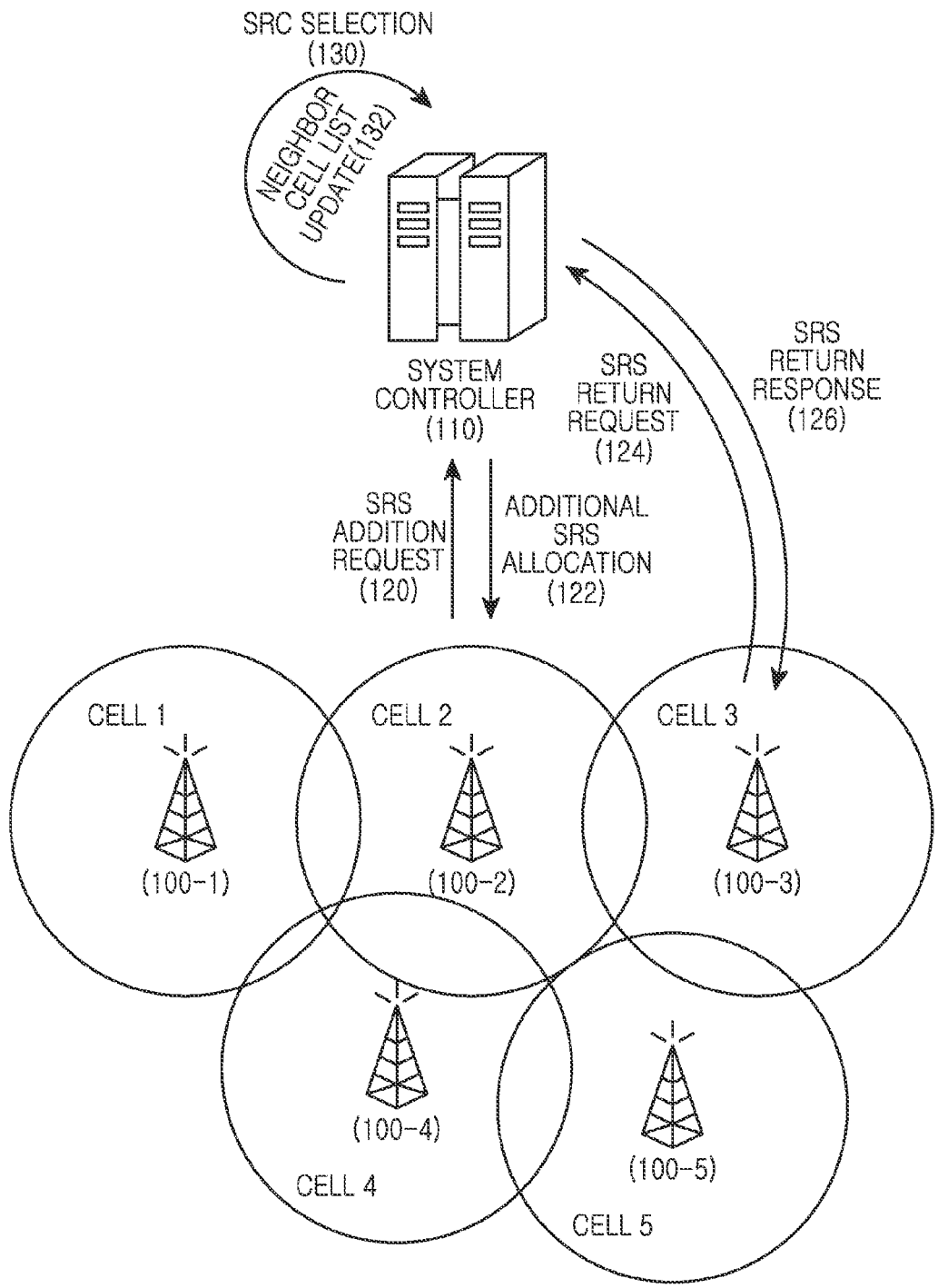
FIG. 1 is a diagram illustrating a configuration of a wireless communication system according to an exemplary embodiment of the present invention.

FIG. 1 illustrates a configuration of a wireless communication system according to an exemplary embodiment of the present invention.

Referring to FIG. 1, a system controller 110 allocates SRS resources to a plurality of BSs 100-1 to 100-5, and stores and manages SRS resource allocation information for allocation of SRS resources to each of the BSs 100-1 to 100-5. For example, the system controller 110 generates and stores a neighbor cell list for SRS resource allocation for each BS, determines SRS resources to be allocated to each cell based on the neighbor cell list, and prevents an SRS conflict from occurring between the BSs 100-1 to 100-5. As an example, the neighbor cell list for SRS resource allocation includes neighbor cells adjacent to the relevant BS and SRS resource information allocated to the respective neighbor cells. For example, the system controller 110 allocates additional SRS resources to the BSs 100-1 to 100-5, or receives and manages a return of allocated SRS resource and manages the same. For example, when receiving an additional SRS resource allocation request from the BS 100-2 in step 120, the system controller 110 determines additional SRS resources to be allocated to the BS 100-2 in consideration of the SRS information of the neighbor cells 100-1, 100-3, 100-4 and 100-5 in step 130, and allocates the additional SRS resources to the BS 100-2 in step 122. Also, when receiving an SRS resource return request from the BS 100-3 in step 124, the system controller 110 deletes return-requested SRS resources from the SRS resource allocation information of the BS 100-3, and transmits a response signal representing the return of the relevant SRS resources to the BS 100-3 in step 126. As an example, the system controller 110 updates the SRS resource allocation information of each BS according to the SRS resource additional allocation and return of the BSs 100-2 and 100-3, and notifies the update of the SRS resource allocation information of the BS 100-2 and 100-3 to the neighbor cells of the BSs 100-2 and 100-3. Also, in step 132, the system controller 110 updates the neighbor cell list for SRS resource allocation of the relevant BS at the request of each of the BSs 100-1 to 100-5.

Next, each of the BSs 100-1 to 100-5 forming a plurality of cells receives an allocation of SRS resources from the system controller 110 at initial BS installation, determines the number of residual SRS resources varying according to the number of connected terminals, and determines whether to request additional SRS resource allocation or return SRS resources. When determining to request additional SRS resource allocation, the BS 100-2 transmits an additional SRS resource allocation request to the system controller 110 in step 120, and receives an allocation of SRS resources from the system controller 110 in step 122. On the other hand, when determining to return SRS resources, the BS 100-3 transmits an SRS resource return request to the system controller 110 in step 124, and receives a response to the SRS resource return from the system controller 110 in step 126. Also, each of the BSs 100-1 to 100-5 receives the neighbor cell list for SRS resource allocation from the system controller 110, updates the neighbor cell list for SRS resource allocation based on a measurement report message received from a terminal, and transmits a neighbor cell list update request to the system controller 110. As an example, the BS may be a distributed BS architecture in which a plurality of RF transceivers (RRH: Remote Radio Head or RF Remote Head) are distributed in one cell.

Hereinafter, with reference to FIGS. 2 to 6, a description will be given of a detailed configuration of the system controller for allocating additional SRS resources to each BS and receiving a return of allocated SRS resources. In the following description, it is assumed that the system controller has already allocated an SRS pool representing SRS resources to each BS according to a predetermined algorithm or an operator's control at the initial installation of each BS. Herein, the SRS pool represents some SRS resources among the entire SRS resources, and is indicated by an SRS pool index. For example, if the SRS resource allocated to one terminal is one SRS resource, the SRS pool includes a plurality of SRS resources and the SRS pool index represents one SRS pool.

Figure 2:
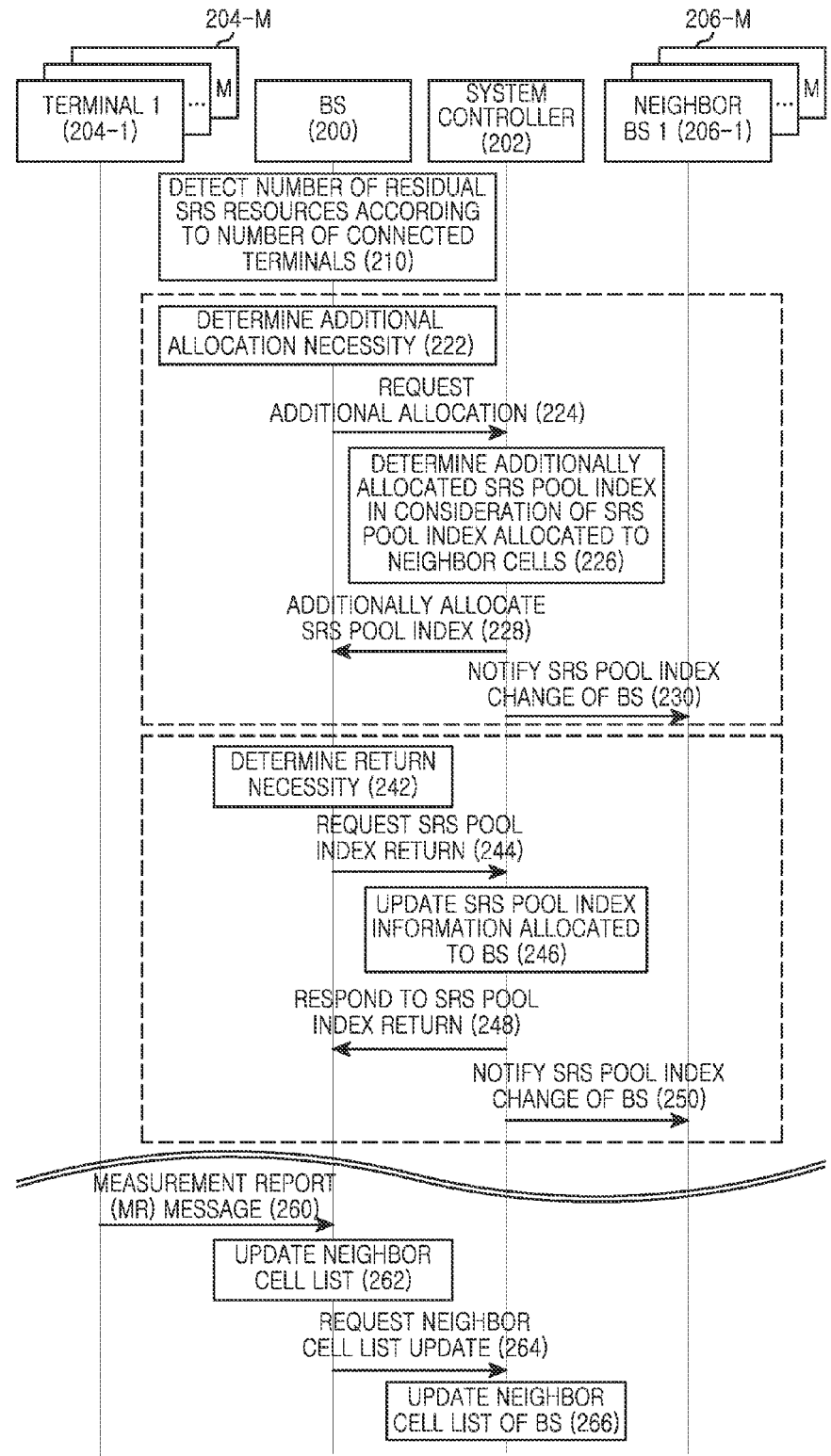
FIG. 2 is a diagram illustrating a signal flow for managing Sounding Reference Signal (SRS) resources in a wireless communication system according to an exemplary embodiment of the present invention.

FIG. 2 illustrates a signal flow for managing SRS resources in a wireless communication system according to an exemplary embodiment of the present invention.

Referring to FIG. 2, in step 210, a BS 200 detects the number of connected terminals 204-1 to 204-M and detects the number of residual resources varying according to the number of connected terminals. The BS 200 compares the number of residual SRS resources with predetermined threshold values to determine whether to request additional SRS resource allocation or return SRS resources. As an example, the predetermined threshold values include a first threshold value for determining whether addition SRS allocation is necessary, and a second threshold value for determining whether SRS resource return is necessary. For example, the first threshold value may be set to be smaller than the second threshold value.

When the number of residual SRS resources is smaller than the first threshold value, the BS 200 determines that additional SRS resource allocation is necessary in step 222, and requests additional SRS pool index allocation in step 224. For example, the BS 200 transmits a request for additional SRS pool index allocation to a system controller 202. In step 226, when receiving the additional allocation request, the system controller 202 identifies a neighbor cell list of the BS 200 and determines an SRS pool index to be allocated to a cell of the BS 200 in consideration of the SRS pool indexes allocated to the neighbor cells included in the identified neighbor cell list. A method of the system controller 202 for determining the SRS pool index will be described below in detail with reference to FIGS. 4A and 4B. Thereafter, in step 228, the system controller 202 transmits the determined SRS pool index to the BS 200 to allocate additional resources. As an example, the system controller 202 updates SRS resource allocation information representing the SRS resources allocated to the BS 200. In step 230, the system controller 202 transmits a message indicating a change in the SRS resource allocation information of the BS 200 to neighbor BS 206-1 to 206-M that include the cell of the BS 200 in a neighbor cell list thereof. As an example, the change indication message includes the SRS pool index information additionally allocated to the BS 200.

On the other hand, when the number of residual SRS resources is greater than the second threshold value, the BS 200 determines that SRS resource return is necessary in step 242. Thereafter, the BS 200 requests the return of an allocated SRS resource in step 244. For example, the BS 200 requests the return of an SRS pool index representing an SRS pool that is not currently used among the SRS pool indexes representing an SRS pool. When receiving the return request, the system controller 202 deletes the return-requested SRS pool index from the SRS resource allocation information of the BS 200 to update the SRS resource allocation information of the BS 200, in step 246. Thereafter, in step 248, the system controller 202 transmits a response message for the SRS pool index return to the BS 200. In step 250, the system controller 202 transmits a message indicating a change in the SRS resource allocation information of the BS 200 to the neighbor BSs 206-1 to 206-M that include the cell of the BS 200 in a neighbor cell list thereof. Herein, the change indication message includes the SRS pool index information deleted from the BS 200.

In step 260, each of the terminals 204-1 to 204-M connected to the BS 200 receives signals from neighbor BSs, measures received signal strengths of the respective neighbor BSs, and a measurement report message including the measured received signal strengths of the respective neighbor BSs to the BS 200. When receiving the measurement report message, the BS 200 updates a neighbor cell list for SRS resource allocation by using the measurement report message in step 262. In step 264, the BS 200 transmits a neighbor cell list update request to the system controller 202. A method for updating the neighbor cell list for SRS resource allocation by using the measurement report message will be described below in detail with reference to FIG. 3. When receiving the neighbor cell list update request, the system controller 202 updates a pre-stored neighbor cell list for SRS resource allocation of the BS 200 in step 266.

Figure 3:
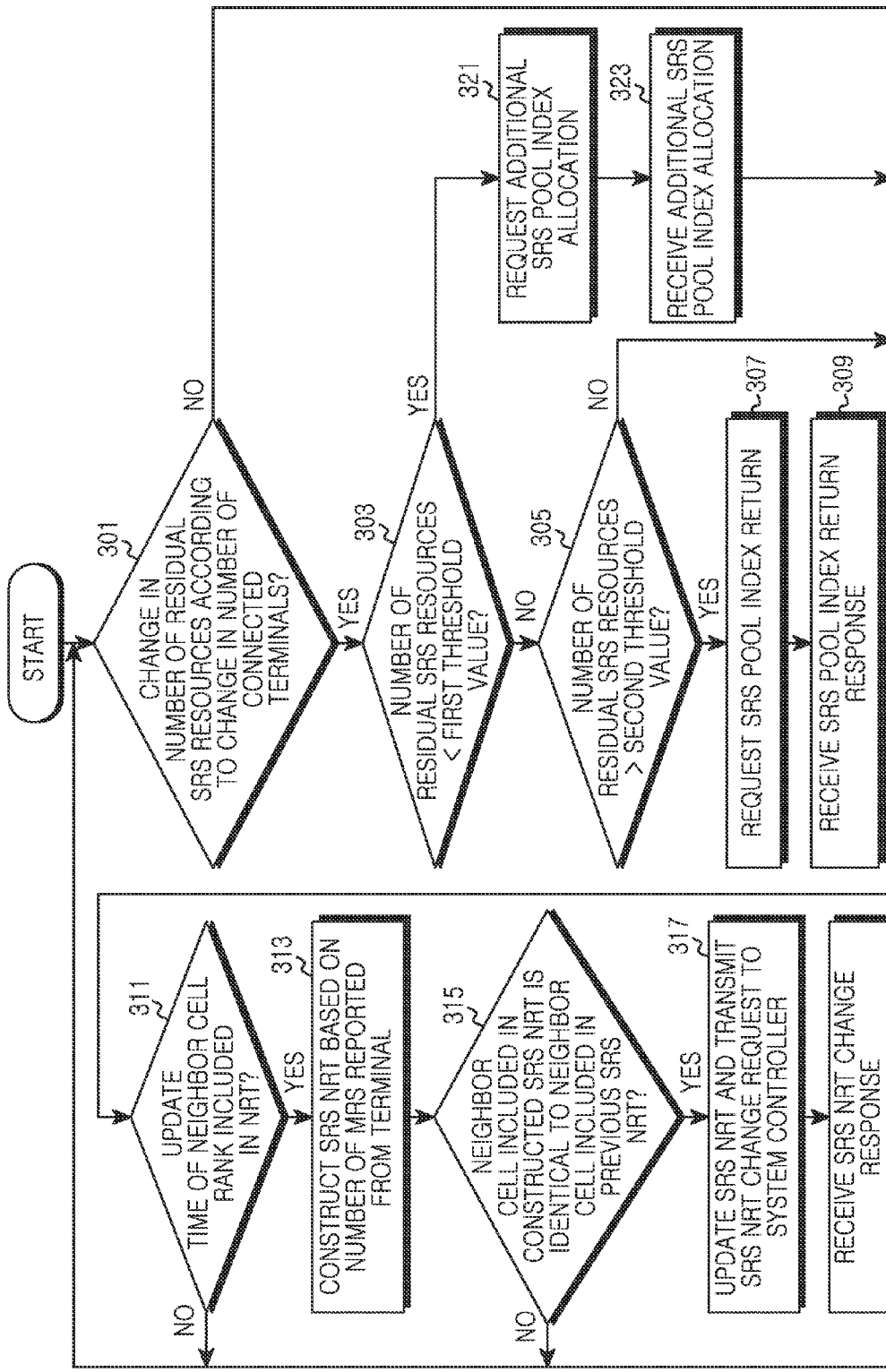
FIG. 3 is a diagram illustrating an operation process of a Base Station (BS) in a wireless communication system according to an exemplary embodiment of the present invention.

FIG. 3 illustrates an operation process of a BS in a wireless communication system according to an exemplary embodiment of the present invention.

Referring to FIG. 3, in step 301, a BS detects whether the number of residual SRS resources varying according to the number of connected terminals changes. For example, the BS determines whether the number of connected terminals increases and thus the number of residual SRS resources among the allocated SRS resources after allocation to the connected terminals decreases, or the number of connected terminals decreases and thus the number of residual SRS resources among the allocated SRS resources after allocation to the connected terminals increases. As an example, the SRS resource is a portion of an SRS pool represented by an SRS pool index allocated from a system controller. When the number of residual SRS resources does not change, the BS proceeds to step 311.

On the other hand, when the number of residual SRS resources changes, the BS proceeds to step 303. In step 303, the BS compares the number of residual SRS resources with a first threshold value and determines whether the number of residual SRS resources is smaller than the first threshold value.

When the number of residual SRS resources is smaller than the first threshold value, the BS proceeds to step 321. In step 321, the BS transmits an additional SRS pool index allocation request message to the system controller. In step 323, the BS receives an allocation of an additional SRS pool index from the system controller. Herein, the BS adds information about the additionally-allocated SRS pool index to the SRS resource allocation information of the base station. Thereafter, the BS proceeds to step 311.

In contrast, when the number of residual SRS resources is determined to be equal to or greater than the first threshold value in step 303, the BS proceeds to step 305. In step 305, the BS compares the number of residual SRS resources with a second threshold value and determines whether the number of residual SRS resources is greater than the second threshold value. When the number of residual SRS resources is equal to or smaller than the second threshold value, the BS determines that SRS resource additional allocation and return are not necessary, and proceeds to step 311.

In contrast, when the number of residual SRS resources is determined to be greater than the second threshold value in step 305, the BS proceeds to step 307. In step 307, the BS identifies an SRS pool that is not allocated to a terminal among the SRS pool index allocated from the system controller, and requests the return of an SRS pool index representing the identified SRS pool. When the number of residual SRS resources is greater than the second threshold value but there is no SRS pool that is not allocated to a terminal, the BS may change the SRS resource used by the terminal so that there is at least one SRS pool that is not allocated to the terminal, and request the return of an SRS pool with respect to the SRS pool that is not allocated to the terminal. Also, when there is an SRS pool that is not allocated to a terminal due to the movement of the terminal to another cell, the BS may request the return of an SRS pool index with respect to the relevant SRS pool. As an example, the base station may request the return of SRS resources except the SRS resources corresponding to the first threshold value among the residual SRS resources. This is to prevent an additional SRS resource allocation request from being generated immediately after the return of the SRS resource because the number of residual SRS resources is smaller than the additional allocation threshold value after the BS returns the SRS resource.

Thereafter, in step 309, the BS receives a response message indicating the completion of the return of the SRS pool index from the system controller.

In step 311, the BS determines whether it is a rank update time of a neighbor cell included in a Neighbor Relation Table (NRT) including information about neighbor cells adjacent to the BS. The NRT may be received from the system controller at the initial installation of the BS. Herein, the rank update time of the neighbor cells included in the NRT may repeat at predetermined periods, and may be an occurrence time of a specific event set according to an operation method of an operator.

When it is not the rank update time of the neighbor cell included in the NRT, the BS returns to step 301. In contrast, when it is the rank update time of the neighbor cell included in the NRT, the BS proceeds to step 313. In step 313, the base station updates a rank of a neighbor cell based on a Measurement Report (MR) message received from a terminal connected to the BS, selects a predetermined number of neighbor cells according to the updated neighbor cell rank, and constructs a Sounding Reference Signal Neighbor Relation Table (SRS NRT) including a neighbor cell list for SRS resource allocation. As an example, the SRS NRT includes IDs of neighbor cells considered to determine an SRS, and SRS resource allocation information of the respective neighbor cells. As an example, the BS may receive the SRS resource information of the respective neighbor cells from the system controller. Specifically, the BS calculates the MR count of the respective neighbor cells through the MR messages from the connected terminal, and updates the rank of the neighbor cell included in the NRT in descending order of the MR count. For example, the BS calculates the MR count of the respective neighbor cells through the MR message, and arranges the respective neighbor cells in descending order of the MR count as shown in Table 1. Thereafter, the BS indicates that there is a Sounding Reference Signal Neighbor Relation (SRS NR) in terms of a SRS only in a predetermined number of cells in descending order of rank (SRS NR=yes). Thereafter, as shown in Table 1, the BS may select neighbor cells indicated by SRS NR=yes among the neighbor cells included in the SRT and construct the SRS NRT.

Table 1 is a ranking table in which the neighbor cells are arranged based on the Measurement Report (MR) count of the respective neighbor cells.

TABLE 1

| Order | Cell ID | SRS NR | MR count |
|-------|---------|--------|----------|
| 0     | 1       | Yes    | 1750     |
| 1     | 10      | Yes    | 1500     |
| 2     | 12      | Yes    | 1400     |
| ...   | ...     | ...    | ...      |
| 9     | 15      | Yes    | 300      |
| 10    | 50      | Yes    | 100      |
| 11    | 31      | No     | 50       |

In Table 1, Order denotes a rank of a relevant neighbor cell in the case in which the neighbor cells are arranged according to the MR count, Cell ID denotes an ID of a relevant neighbor cell, SRS NR indicates whether a relevant neighbor cell is included in SRS NRT, and MR count denotes a MR count of a relevant neighbor cell. For example, Table 1 shows that a neighbor cell with a cell ID of 1 has been reported 1750 times through a MR message from a connected terminal, a neighbor cell with a cell ID of 10 has been reported 1400 times, a neighbor cell with a cell ID of 15 has been reported 300 times, a neighbor cell with a cell ID of 50 has been reported 100 times, and a neighbor cell with a cell ID of 31 has been reported 50 times. When the SRS NRT includes 10 neighbor cells that are high in the MR count among the neighbor cells included in the NRT, the SRS NRT is constructed by the upper 10 neighbor cells according to the order arranged based on the MR count. The MR count of the respective neighbor cells may be a measurement report count accumulated for a predetermined time, or may be a moving average of the measurement report count accumulated for the predetermined time. Herein, the moving average may be calculated as Equation (1):

$$AvgCntMR(n) = \alpha S AvgCntMR(n-1) + (1-\alpha) s CntMR \quad (1)$$

where AvgCntMR(n) denotes a moving average of a MR count at a time point $n^*T_{period}$ that is a current time point, AvgCntMR(n−1) denotes a moving average of a MR count at a previous time point $(n-1)^*T_{period}$, CntMR denotes a MR count of a relevant neighbor cell between a previous time point (n−1) to a current time point 'n', and $T_{period}$ denotes a MR count calculation period of a BS.

In step 315, the BS determines whether the neighbor cells included in the SRS NRT constructed in step 313 are identical to the neighbor cells included in the SRS NRT at a previous update time point, When the neighbor cells included in the SRS NRT constructed in step 313 are not identical to the neighbor cells included in the SRS NRT at a previous update time point, the BS returns to step 301. In contrast, when the neighbor cells included in the SRS NRT constructed in step 313 are identical to the neighbor cells included in the SRS NRT at a previous update time point, the BS proceeds to step 317. In step 317, the BS performs update such that the neighbor cells included in the SRS NRT constructed in step 313 are included instead of the neighbor cells included in the SRS NRT at a previous update time point, and transmits an SRS NRT change request message including the neighbor cells included in the SRS NRT constructed in step 313 to the system controller. Thereafter, in step 319, the BS receives an SRS NRT change response message from the system controller. Herein, the SRS NRT change response message includes SRS resource allocation information of neighbor cells newly included in the SRS NRT of the BS. Thereafter, the BS returns to step 301.

In the method illustrated in FIG. 3, the BS updates the rank of the respective neighbor cells included in the NRT including the neighbor cell list of the BS based on the MR message received from the terminal, selects a predetermined number of neighbor cells having the upper rank, and constructs an SRS NRT. However, according to exemplary embodiments of the present invention, according to design modes, without using the NRT including the neighbor cell list, the BS may measure a MR count of the neighbor cells with measurements reported through the MR message of the terminal, select a predetermined number of neighbor cells according to the measurement report count, and construct an SRS NRT.

Figure 4A:
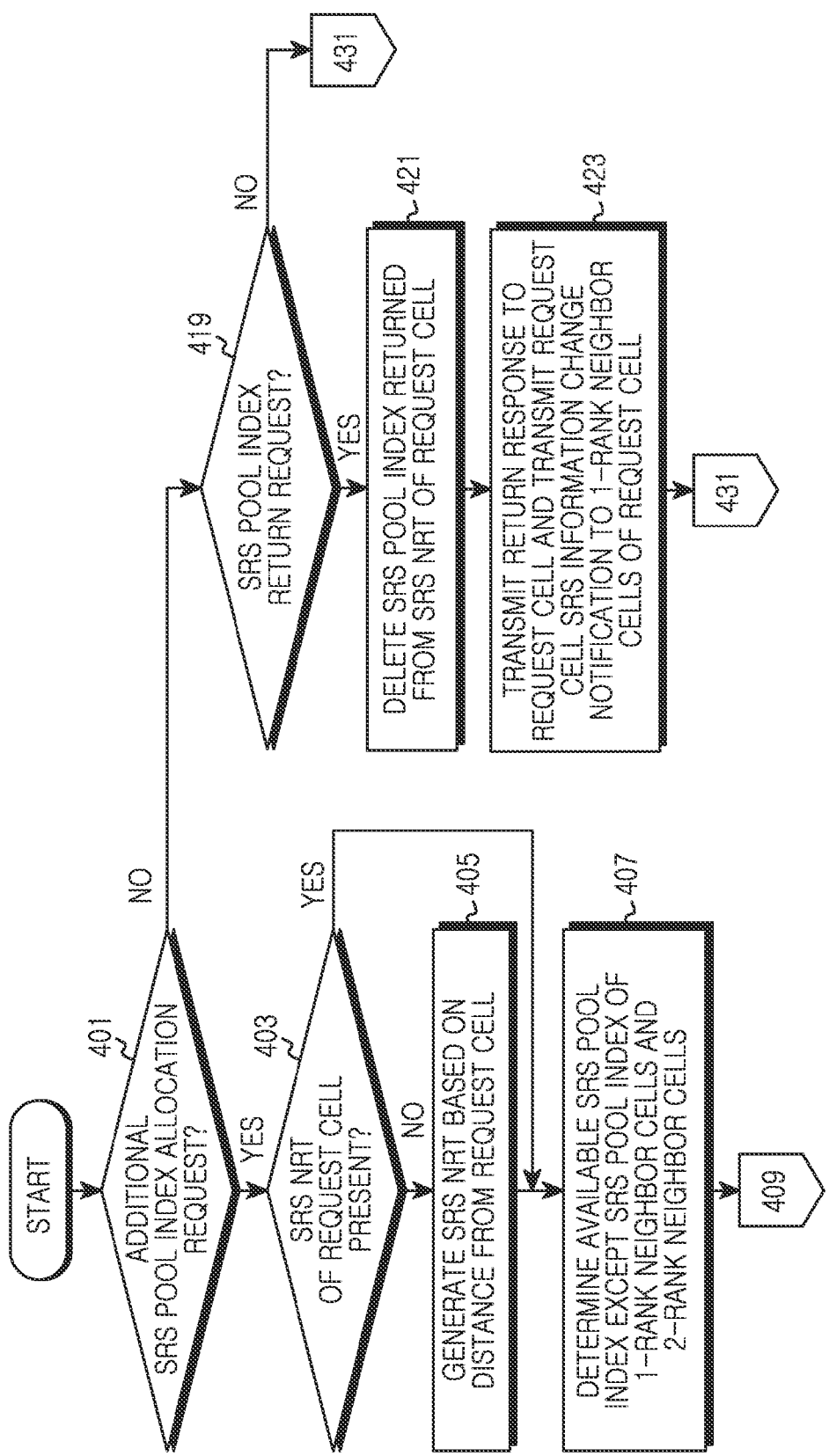
FIGS. 4A and 4B are diagrams illustrating an operation process of a system controller in a wireless communication system according to an exemplary embodiment of the present invention.
Figure 4B:
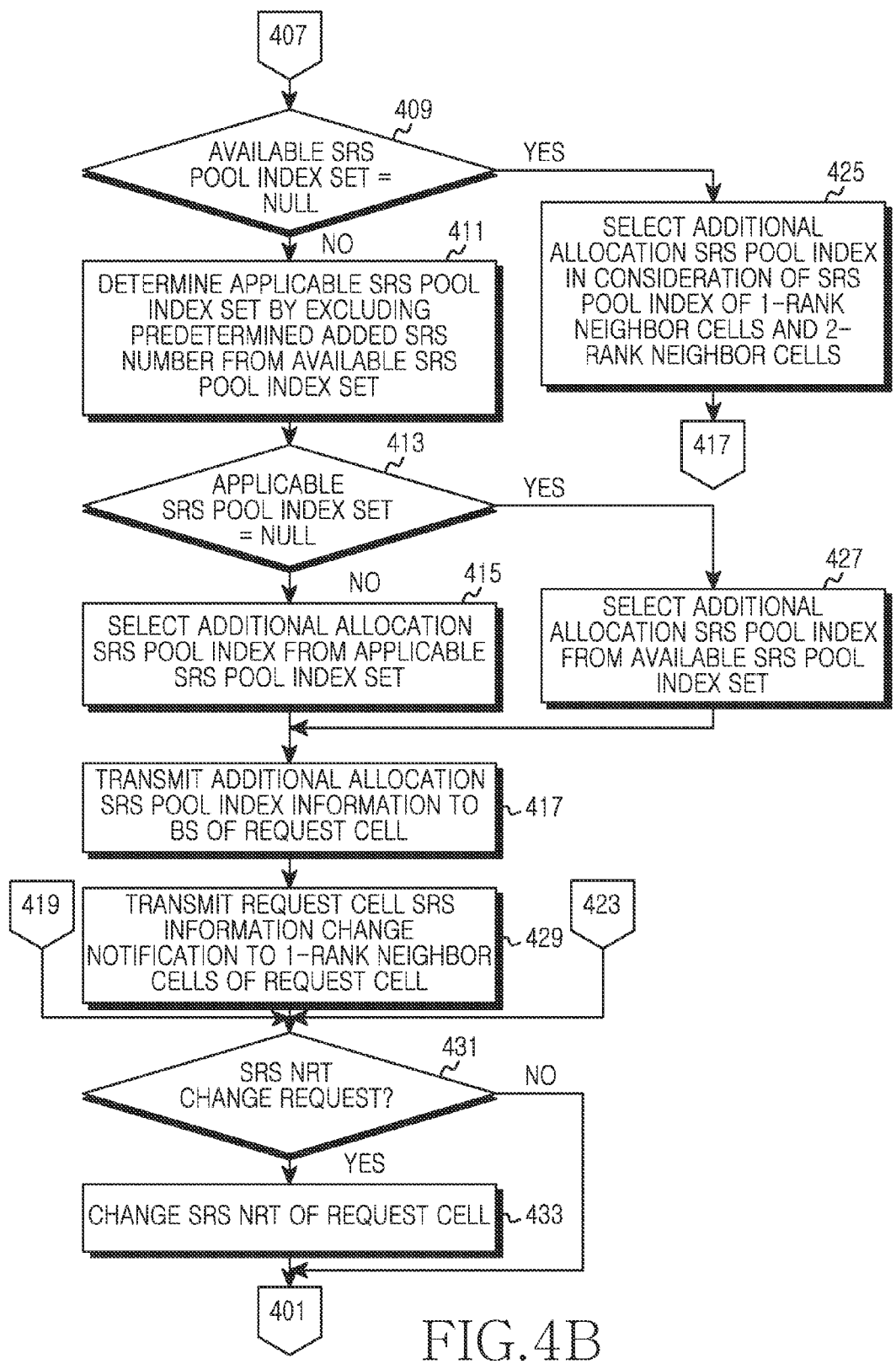

FIGS. 4A and 4B illustrate an operation process of a system controller in a wireless communication system according to an exemplary embodiment of the present invention.

Referring to FIGS. 4A and 4B, in step 401, the system controller determines whether an additional SRS pool index allocation request message is received from a BS.

When the additional SRS pool index allocation request message is received in step 401, the system controller proceeds to step 403. In step 403, the system controller determines whether there is an SRS NRT for the BS having requested the additional allocation. Herein, the system controller may select a predetermined number of neighbor cells based on position information of the BS at the initial installation of the BS, and generate the SRS NRT. As an example, determining whether there is an SRS NRT of the requesting BS although an SRS NRT is generated at the initial installation of the base station is to provide for an exceptional situation. When there is an SRS NRT of the requesting BS in step 403, the system controller proceeds to step 407.

In contrast, when there is no SRS NRT of the requesting BS, the system controller proceeds to step 405. In step 405, the system controller selects neighbor cells whose distance from the requesting cell is equal to or smaller than a threshold distance based on the position information of the requesting base station, and generates an SRS NRT of the requesting base station. As an example, when the number of neighbor cells whose distance from the requesting cell is equal to or smaller than the threshold distance is smaller than the maximum number of cells that can be included in the SRS NRT, the BS selects all of the neighbor cells whose distance from the requesting cell is equal to or smaller than the threshold distance, and includes the same in the SRS NRT of the requesting BS. In contrast, when the number of neighbor cells whose distance from the requesting cell is equal to or smaller than the threshold distance is greater than the maximum number of cells that can be included in the SRS NRT, the BS selects neighbor cells corresponding to the maximum number of cells that can be included in the SRS NRT, among the neighbor cells whose distance from the requesting cell is equal to or smaller than the threshold distance, and includes the same in the SRS NRT of the requesting BS. As an example, the system controller may select neighbor cells in ascending order of the distance from the requesting cell.

Thereafter, in step 407, the system controller determines an available SRS pool index set including residual SRS pool indexes among the entire SRS pool indexes, except the SRS pool index of neighbor cells included in the SRS NRT of the requesting BS, the SRS pool index of neighbor cells included in the SRS NRT of the neighbor cells, the SRS pool index of neighbor cells including the requesting BS in the SRS NRT thereof, and the SRS pool index of neighbor cells included in the SRS NRT of neighbor cells including the requesting BS in the SRS NRT thereof. As an example, considering not only the SRS NRT of the requesting BS but also the SRS pool index of neighbor cells including the requesting BS in the SRS NRT thereof is to consider the case in which there is a neighbor cell including the requesting BS in the SRS NRT although not included in the SRS NRT of the requesting BS due to different cell sizes. For the convenience of description, the neighbor cells included in the SRS NRT of the requesting BS and the neighbor cells including the requesting BS in the SRS NRT thereof will be referred to as first-rank neighbor cells, and neighbor cells included in the first-rank neighbor cells will be referred to as second-rank neighbor cells. For example, when the neighbor cells included in the SRS NRT of the requesting BS are a cell 1 and a cell 3; the neighbor cells including the requesting BS in the SRS NRT are a cell 1, a cell 3, and a cell 8; neighbor cells included in the SRS NRT of the cell 1 are a cell 3 and a cell 4; neighbor cells included in the NRT of the cell 3 are a cell 2 and a cell 5; and neighbor cells included in the NRT of the cell 8 are a cell 1 and a cell 7, the cells 1, 3 and 8 may be referred to as first-rank neighbor cells, and the cells 2, 4, 5 and 7 may be referred to as second-rank neighbor cells.

Thereafter, in step 409, the system controller determines whether the available SRS pool index set is null. For example, the system controller determines whether there is an SRS pool index included in the available SRS pool index set.

When the available SRS pool index set is null, the system controller proceeds to step 425. In step 425, the system controller selects an SRS pool index to be additionally allocated in consideration of the SRS pool index of the first-rank neighbor cells and the second-rank cells with respect to the requesting BS. As an example, with respect to each of the SRS pool indexes being used by the first-rank neighbor cells and the second-rank neighbor cells, the system controller measures a minimum distance from the cell using the relevant SRS pool index based on the requesting BS, compares the measured minimum distances of the respective SRS pool indexes, and selects SRS pool indexes in descending order of the minimum distance. Thereafter, the system controller proceeds to step 417.

In contrast, when the available SRS pool index set is not null, the system controller proceeds to step 411. In step 411, the system controller determines an applicable SRS pool index set including residual SRS pool indexes excluding a predetermined number of added SRS pool indexes from the available SRS pool index set. As an example, the number of added SRS pool indexes is the number of SRS pool indexes retained in the system controller in order to provide for the case of BS extension.

Thereafter, in step 413, the system controller determines whether the applicable SRS pool index set is null. When the applicable SRS pool index set is determined not to be null in step 413, the system controller proceeds to step 415 in which the system controller selects an additional SRS pool index to be allocated to the requesting BS from the applicable SRS pool index set. Herein, the system controller may select a predetermined number of SRS pool indexes among the SRS pool indexes included in the applicable SRS pool index set according to a predetermined method, and may select a certain number of SRS pool indexes.

In contrast, when the applicable SRS pool index set is null in step 413, the system controller proceeds to step 427 in which the system controller selects an additional SRS pool index to be allocated to the requesting BS from the available SRS pool index set. As an example, the system controller may select a predetermined number of SRS pool indexes among the SRS pool indexes included in the available SRS pool index set according to a predetermined method, and may select a certain number of SRS pool indexes.

After selecting the additional SRS pool index to be allocated, the system controller transmits SRS pool index information selected for the additional allocation to the requesting BS, in step 417. Thereafter, the system controller transmits a signal indicating a change in the SRS resource allocation information of the requesting BS to the first-rank neighbor cells of the requesting BS in step 429, and proceeds to step 431.

When the additional SRS pool index allocation request message is not received in step 401, the system controller proceeds to step 419. In step 419, the system controller determines whether an SRS pool index return request message is received from the BS. When the SRS pool index return request message is not received, the system controller proceeds to step 431. When the SRS pool index return request message is received, the system controller identifies an SRS pool index to be returned from the received return request message and deletes the identified SRS pool index from the SRS NRT including the SRS resource allocation information of the requesting BS in step 421. As an example, the system controller changes the SRS resource allocation information of the requesting BS in all the SRS NRTs including the requesting BS. Thereafter, the system controller transmits a signal indicating a change in the SRS resource information allocated to the cell of the requesting BS to the first-rank neighbor cells of the requesting BS in step 423, and proceeds to step 431.

In step 431, the system controller determines whether an SRS NRT change request is received from the BS. When the SRS NRT change request is not received from the BS, the system controller returns to step 401. When the SRS NRT change request is received from the base station, the system controller changes the SRS NRT of the base station according to the SRS NRT change request in step 433 and thereafter proceeds to step 401.

Figure 5:
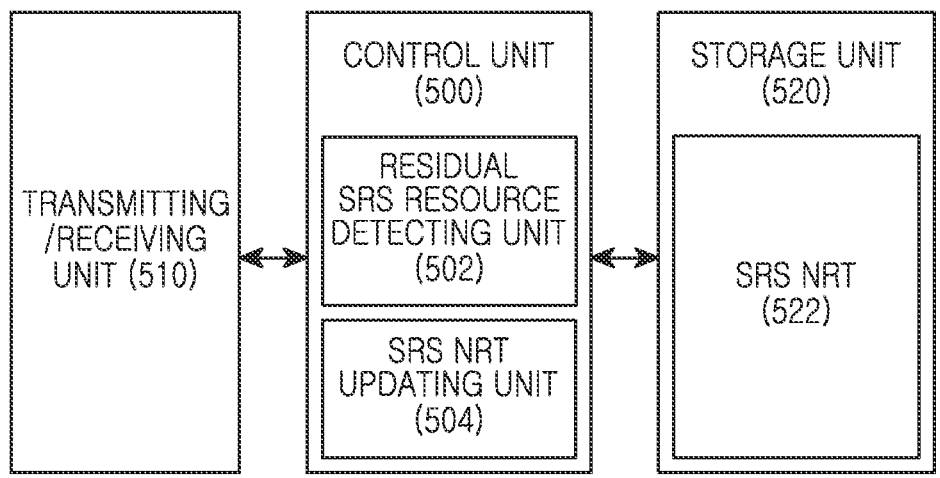
FIG. 5 is a diagram illustrating a block configuration of a BS in a wireless communication system according to an exemplary embodiment of the present invention.

FIG. 5 illustrates a block configuration of a BS in a wireless communication system according to an exemplary embodiment of the present invention.

Referring to FIG. 5, a BS includes a control unit 500, a transmitting/receiving unit 510, and a storage unit 520.

According to exemplary embodiments of the present invention, the control unit 500 controls and processes an overall operation of the BS, and controls and processes a function for receiving an allocation of SRS resources from a system controller and for allocating the SRS resources to serving terminals. According to exemplary embodiments of the present invention, the control unit 500 includes a residual SRT resource detecting unit 502. Accordingly, the control unit 500 detects the number of residual SRS resources varying according to the number of connected terminals. According to the number of residual SRS resources, the control unit 500 determines whether to transmit an additional SRS resource allocation request or an allocated SRS resource return request to the system controller. For example, when the number of residual SRS resources is smaller than a first threshold value, the control unit 500 controls a function for receiving an allocation of additional SRS resources from the system controller, and when the number of residual SRS resources is equal to or greater than a second threshold value, the control unit 500 controls a function for returning allocated SRS resources to the system controller. According to exemplary embodiments of the present invention, the control unit 500 includes an SRS NRT updating unit 504. Accordingly, the control unit 500 calculates a MR count of respective neighbor cells based on a MR message received from a terminal, and updates an SRS NRT that is a table including a neighbor cell list for SRS resource allocation of the BS.

Under the control of the control unit 500, the transmitting/receiving unit 510 communicates signals with a serving terminal and a system controller. According to exemplary embodiments of the present invention, the transmitting/receiving unit 510 transmits an SRS resource allocation request signal, an SRS resource return request signal, or an SRS NRT update request signal to the system controller, receives a response signal thereof, and provides the same to the control unit 500. Also, the transmitting/receiving unit 510 receives a MR message from a serving terminal and provides the same to the control unit 500.

The storage unit 520 stores various programs and data for operation of the BS. According to exemplary embodiments of the present invention, the storage unit 520 stores SRS resource information allocated from the system controller. For example, the storage unit 520 may store SRS pool index information. In particular, under the control of the control unit 500, the storage unit 520 stores and updates an SRS NRT 522 received from the system controller. Herein, the SRS NRT 522 is a table including a neighbor cell list for SRS resource allocation of the BS. Specifically, the SRS NRT includes cell IDs of neighbor cells and SRS resource allocation information of the neighbor cells. For example, the SRS NRT 522 may include SRS pool index information.

Figure 6:
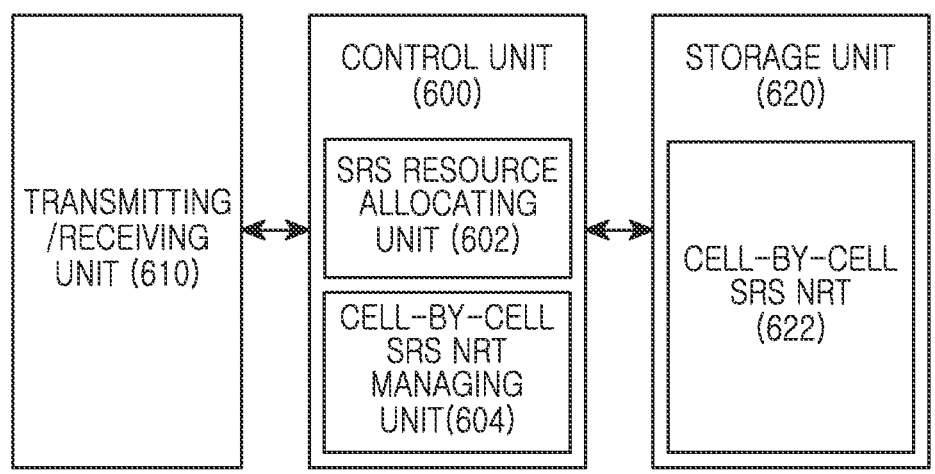
FIG. 6 is a diagram illustrating a block configuration of a system controller in a wireless communication system according to an exemplary embodiment of the present invention.

FIG. 6 illustrates a block configuration of a system controller in a wireless communication system according to an exemplary embodiment of the present invention.

Referring to FIG. 6, a system controller includes a control unit 600, a transmitting/receiving unit 610, and a storage unit 620.

According to exemplary embodiments of the present invention, the control unit 600 controls an overall operation of the system controller, and controls and processes a function for allocating SRS resources to a plurality of BSs and managing the allocated SRS resources. In particular, the control unit 600 includes an SRS resource allocating unit 602. Accordingly, the control unit 600 performs a function for allocating additional SRS resources to a BS or receiving a return of the allocated SRS resources. As an example, the SRS resource allocating unit 602 allocates additional SRS resources to a BS, based on a cell-by-cell SRS NRT 622 stored in the storage unit 620, in consideration of the SRS resources allocated to the first-rank neighbor cell and the second-rank neighbor cell of the BS. Also, according to exemplary embodiments of the present invention, the control unit 600 includes a cell-by-cell SRS NRT managing unit 604. Accordingly, the control unit 600 updates the cell-by-cell SRS NRT 622 stored in the storage unit 620 according to the request of each BS. Also, when the SRS resource allocation information of a cell changes, the control unit 600 notifies a change in the SRS resource allocation information of the cell to the first-rank neighbor cells of the cell.

Under the control of the control unit 600, the transmitting/receiving unit 610 communicates signals with a plurality of BSs. According to exemplary embodiments of the present invention, the transmitting/receiving unit 610 receives an SRS resource allocation request signal, an SRS resource return request signal, or an SRS NRT update request signal from a BS and provides the received signal to the control unit 600, and transmits a response signal thereof under the control of the control unit 600.

The storage unit 620 stores various programs and data for operation of the BS. According to exemplary embodiments of the present invention, the storage unit 620 stores the entire SRS resource information. For example, the storage unit 620 may store the entire SRS pool index information. In particular, under the control of the control unit 600, the storage unit 620 stores and updates the cell-by-cell SRS NRT 622. As an example, the SRS NRT 622 is a table including a neighbor cell list for SRS resource allocation of the relevant BS. Specifically, the SRS NRT 622 includes cell IDs of neighbor cells adjacent to the BS and SRS resource allocation information of the neighbor cells. For example, the SRS NRT 622 may include SRS pool index information.

As described above, exemplary embodiments of the present invention allocates additional SRS resources or returns the allocated SRS resources according to the number of residual SRS resources varying according to the number of terminals connected to a BS in a wireless communication system, thereby making it possible to improve the utilization of SRS resources. Also, according to exemplary embodiments of the present invention the system controller determines SRS resources to be allocated to the BS in consideration of the SRS resources allocated to the neighbor cells of the relevant cell, thereby making it possible to reduce the occurrence probability of a SRS conflict. Also, according to exemplary embodiments of the present invention, the system controller updates the neighbor cells of each cell based on the measurement report message of the terminal in the wireless communication system, thereby making it possible to reflect a change in the neighbor cells and reduce the occurrence of an SRS conflict.

While the invention has been shown and described with reference to certain exemplary embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

What is claimed is:

1. A method of a Base Station (BS) for managing Sounding Reference Signal (SRS) resources in a wireless communication system, the method comprising:
receiving an allocation of SRS resources from a system controller;
allocating SRS resources to connected terminals;
determining a number of residual SRS resources according to the number of connected terminals; and
transmitting one of an SRS resource allocation request and an allocated SRS resource return request to the system controller according to the number of residual SRS resources.

2. The method of claim 1, wherein the transmitting of one of the SRS resource allocation request and the allocated SRS resource return request to the system controller according to the number of residual SRS resources comprises:
comparing the number of residual SRS resources with a first threshold value and a second threshold value;
transmitting the SRS resource allocation request to the system controller if the number of residual SRS resources is smaller than the first threshold value; and
transmitting the allocated SRS resource return request to the system controller if the number of residual SRS resources is equal to or greater than the second threshold value.

3. The method of claim 1, further comprising:
receiving an neighbor cell list including at least one neighbor cell adjacent to the BS and SRS resource information allocated to each neighbor cell from the system controller;
updating the neighbor cell list based on a Measurement Report (MR) message received from a terminal; and
transmitting a neighbor cell list update request to the system controller.

4. The method of claim 3, wherein the updating of the neighbor cell list by using the MR message received from the terminal comprises:
calculating a MR count of each neighbor cell through the MR message received from the terminal; and
selecting a predetermined number of neighbor cells among a plurality of neighbor cells with measurements reported, based on the MR count.

5. An apparatus of a Base Station (BS) for managing Sounding Reference Signal (SRS) resources in a wireless communication system, the apparatus comprising:
a transmitting/receiving unit for transmitting/receiving signals; and
a control unit for receiving an allocation of SRS resources from a system controller, for allocating SRS resources to connected terminals, for determining a number of residual SRS resources according to the number of connected terminals, and for transmitting one of an SRS resource allocation request and an allocated SRS resource return request to the system controller according to the number of residual SRS resources.

6. The apparatus of claim 5, wherein the control unit is configured to compare the number of residual SRS resources with a first threshold value and a second threshold value, to operatively transmit the SRS resource allocation request to the system controller if the number of residual SRS resources is smaller than the first threshold value, and to operatively transmit the allocated SRS resource return request to the system controller if the number of residual SRS resources is equal to or greater than the second threshold value.

7. The apparatus of claim 5, wherein the control unit is configured to receive an neighbor cell list including at least one neighbor cell adjacent to the BS and SRS resource information allocated to each neighbor cell from the system controller through the transmitting/receiving unit, to update the neighbor cell list based on a Measurement Report (MR) message received from a terminal, and to transmit a neighbor cell list update request to the system controller.

8. The apparatus of claim 5, wherein the control unit is configured to calculate a MR count of each neighbor cell through the MR message received from the terminal, to select a predetermined number of neighbor cells among a plurality of neighbor cells with measurements reported, based on the MR count, and to update the neighbor cell list.

* * * * *